(12) United States Patent
Wiegand

(10) Patent No.: US 10,597,133 B2
(45) Date of Patent: Mar. 24, 2020

(54) AEROFOIL FOR AN AIRCRAFT, AND AN AIRCRAFT

(71) Applicant: Lilium GmbH, Gilching (DE)

(72) Inventor: Daniel Wiegand, München (DE)

(73) Assignee: Lilium GmbH, Gilching (DE)

( * ) Notice: Subject to any disclaimer, the term of this patent is extended or adjusted under 35 U.S.C. 154(b) by 6 days.

(21) Appl. No.: 16/256,374

(22) Filed: Jan. 24, 2019

(65) Prior Publication Data
US 2019/0217937 A1    Jul. 18, 2019

Related U.S. Application Data

(62) Division of application No. 15/135,624, filed on Apr. 22, 2016, now Pat. No. 10,293,914.

(30) Foreign Application Priority Data

Apr. 23, 2015   (DE) .................. 10 2015 207 445

(51) Int. Cl.
| | | |
|---|---|---|
| *B64C 3/48* | (2006.01) | |
| *B64C 29/00* | (2006.01) | |
| *B64C 1/00* | (2006.01) | |
| *B64C 3/38* | (2006.01) | |

(Continued)

(52) U.S. Cl.
CPC ............ *B64C 1/0009* (2013.01); *B64C 3/385* (2013.01); *B64C 3/48* (2013.01); *B64C 29/0025* (2013.01); *B64C 29/0033* (2013.01); *B64D 27/02* (2013.01); *B64D 27/12* (2013.01);
(Continued)

(58) Field of Classification Search
CPC ......... B64C 39/08; B64C 39/12; B64C 3/385; B64C 29/0025; B64C 29/0033; B64C 29/005; B64C 29/0075; B64C 29/0083; B64D 27/02; B64D 27/12; B64D 2033/0253

See application file for complete search history.

(56) References Cited

U.S. PATENT DOCUMENTS

| | | | |
|---|---|---|---|
| 2,459,009 A | 1/1949 | Wallis | |
| 2,756,008 A * | 7/1956 | Davidson | ................ B64C 3/385 |
| | | | 244/15 |
| 2,964,264 A | 12/1960 | Multhopp | |

(Continued)

FOREIGN PATENT DOCUMENTS

DE    1988476    6/1968

OTHER PUBLICATIONS

German Search Report dated Mar. 23, 2016.

*Primary Examiner* — Richard R. Green
(74) *Attorney, Agent, or Firm* — Rankin, Hill & Clark LLP

(57) ABSTRACT

An aircraft includes a fuselage and first and second pairs of aerofoils, the aerofoils of each pair extend from opposing sides of the fuselage. Each aerofoil includes a first lift body and a second lift body which is arranged behind the first lift body in a direction of flow of the aerofoil. The second lift body is pivotable relative to the first lift body between a cruising flight position in which both lift bodies together define an elongate and substantially continuous cross section of the aerofoil in the direction of flow, and a take-off/landing position in which the second lift body is angled downwards relative to the first lift body in order to increase a lift of the aerofoil. At least one engine is arranged on the second lift body of at least one of the first and second pairs of aerofoils.

12 Claims, 14 Drawing Sheets

Figure 1:
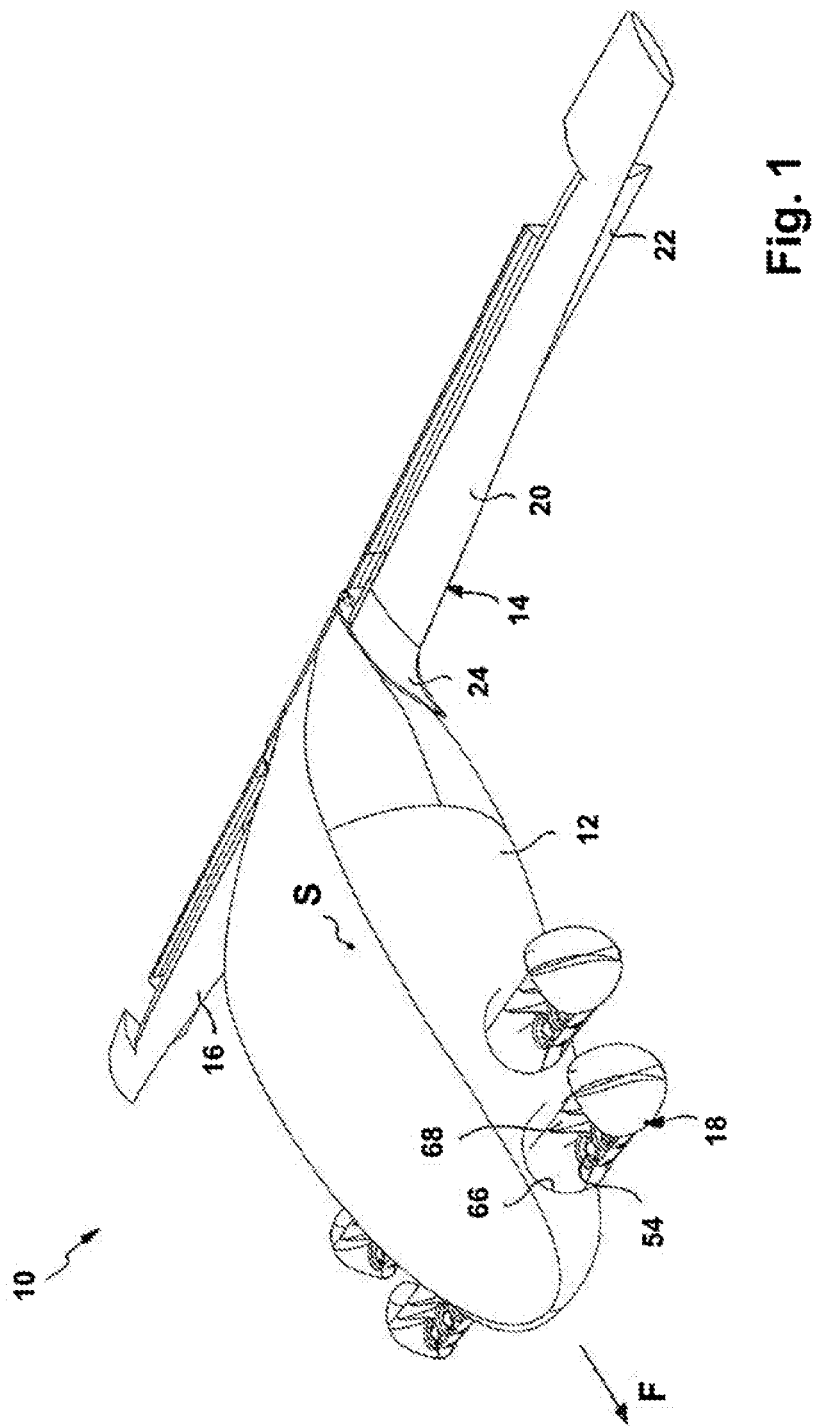

(51) Int. Cl.
  *B64D 27/02* (2006.01)
  *B64D 27/12* (2006.01)
(52) U.S. Cl.
  CPC ................ *Y02T 50/12* (2013.01); *Y02T 50/14* (2013.01); *Y02T 50/44* (2013.01)

(56) References Cited

U.S. PATENT DOCUMENTS

| | | |
|---|---|---|
| 2,989,269 A | 6/1961 | Bel |
| 3,179,354 A | 4/1965 | Calderon |
| 3,273,827 A | 9/1966 | Girard |
| 4,149,688 A | 4/1979 | Miller, Jr. |
| 6,659,394 B1 | 12/2003 | Shenk |
| 8,342,441 B2 | 1/2013 | Yoeli |
| 8,936,212 B1 * | 1/2015 | Fu ..................... B64C 29/0033 244/6 |
| 9,387,929 B2 | 7/2016 | Gaillimore |
| 2013/0026303 A1 | 1/2013 | Wang |
| 2015/0191243 A1 | 7/2015 | Fujimoto |
| 2016/0288903 A1 | 10/2016 | Rothhaar et al. |

* cited by examiner

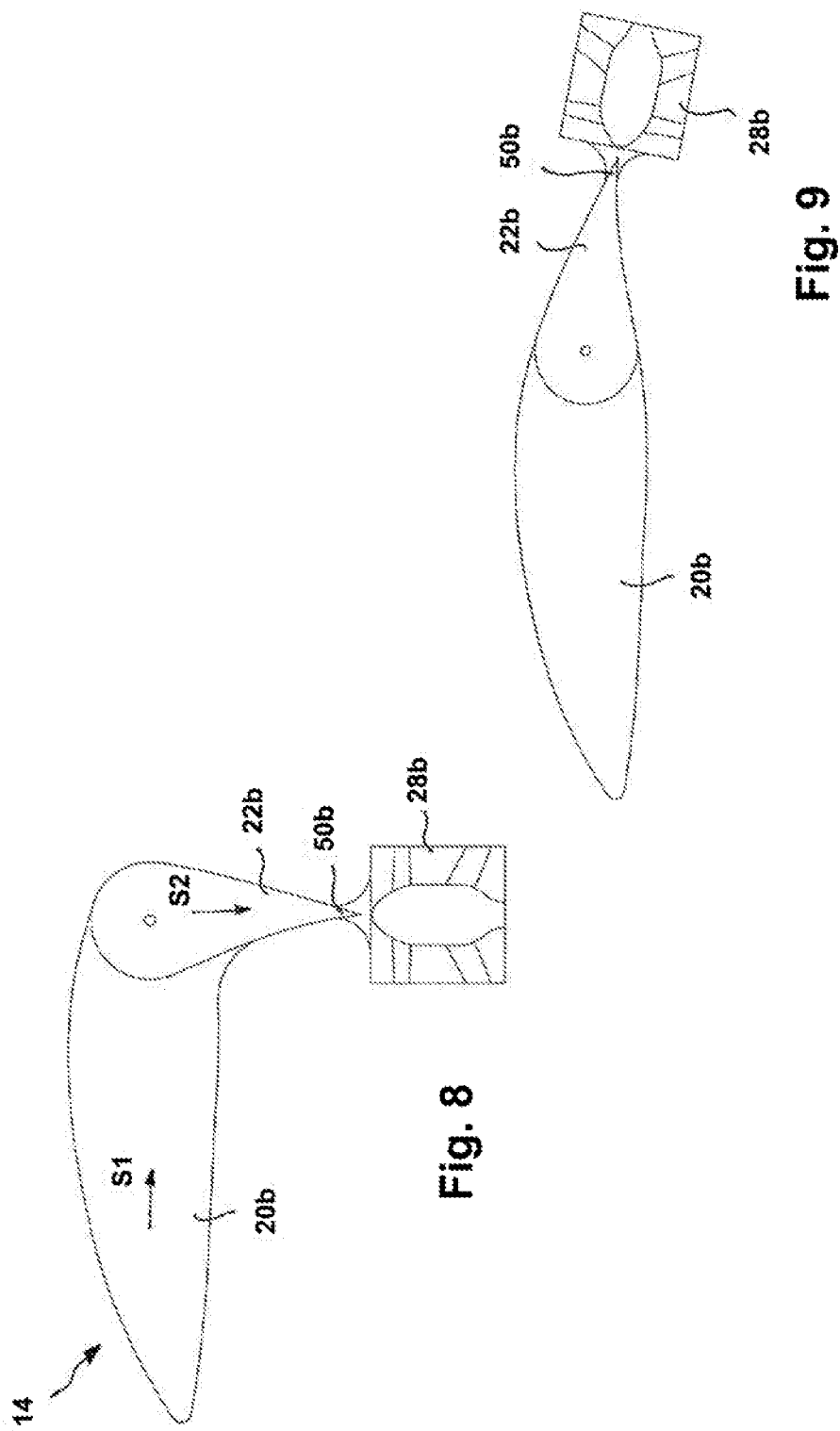

AEROFOIL FOR AN AIRCRAFT, AND AN AIRCRAFT

The present application is a divisional of U.S. patent application Ser. No. 15/135,624 filed on Apr. 22, 2016, which is incorporated herein by reference.

The present invention relates to an aerofoil for an aircraft, comprising an engine, a first lift body, and a second lift body which is arranged behind the first lift body in the direction of flow of the aerofoil, the second lift body being pivotable relative to the first lift body between a cruising flight position in which both lift bodies together define an elongate and substantially continuous cross section of the aerofoil in the direction of flow, and a take-off/landing position in which the second lift body is angled downwards relative to the first lift body in order to increase a lift of the aerofoil. The invention further relates to an aircraft which comprises such an aerofoil.

In most known aerofoils, one first lift body which is at the front in the direction of flow is designed, as the larger and statically load-bearing element, to be fastened to the fuselage of the aircraft, whereas a second lift body, in the form of a landing flap or an aileron, which is at the rear in the direction of flow, is arranged on the first lift body in such a way that it can pivot about an axis extending transversely to the direction of flow. An engine of conventional aircraft can be located on the nose or on the tail of the fuselage or on a front side or lower face of the first lift body of the aerofoil. Said engine provides the required thrust and is thus attached to the aircraft in such a way that the direction of thrust of the engine is oriented in the direction of flight.

Furthermore, vertical take-off aircraft are known which are designed for hovering flight and, for this purpose, comprise engines which can be rotated about horizontally extending pivot axes. During take-off or landing or during hovering flight, the engines are placed in a take-off/landing position in which the direction of thrust is oriented vertically upwards. In order to accelerate the aircraft after take-off, the engines are then continuously pivoted in such a way that the direction of thrust ultimately points in the forward direction when the speed of the aircraft reaches the minimum flying speed.

Vertical take-off aircraft have clear advantages in terms of greater flexibility during take-off and landing, but in terms of effectiveness and long-distance capability, they currently cannot match conventional aircraft. By contrast, conventional aircraft are only able to fly above a specific minimum speed and accordingly require large take-off and landing systems.

It is an object of the invention to provide an aerofoil for an aircraft which has a low minimum speed or can even be operated as a vertical take-off aircraft and which allows efficient cruising flight at the same time.

According to a first aspect of the present invention, the object of the invention is achieved by an aerofoil according to claim 1.

According to an important feature of the present invention from the first aspect, the engine is arranged on the second lift body which is at the rear in the direction of flow. In this way, the following technical effect is achieved. Analogously to the extension of landing flaps during the take-off or landing of a conventional aircraft, angling the second lift body relative to the first lift body increases the lift, which is very important when flying at low speed, for example during take-off and landing. This downward pivoting of the second lift body when flying at low speed can now be used according to the invention to likewise pivot the direction of thrust of the engine which is attached to said second lift body, specifically to incline said direction of thrust upwards. Depending on the direction of inclination of the engine, the thrust thereof can thus likewise be used in part or in full to increase the lift so that the minimum speed of the aircraft can be reduced.

Furthermore, by mounting the engine on the second lift body, when flying at low speed (in particular during take-off or landing), the following additional effect is achieved. If, when flying at low speed, the second lift body is angled downwards relative to the first lift body, beyond a specific adjustment angle of the aerofoil, or when the speed falls below the minimum speed, a stall occurs on the upper face of the aerofoil, which leads to a loss of lift. This stall defines the minimum speed of the aircraft. The stall begins in the rear part of the aerofoil on the second lift body, since it is angled downwards and thus is inclined against the direction of flight to the greatest extent overall. By mounting the engine on the second lift body, this starting stall is prevented in a particularly effective manner, since the engine conveys the air which is sucked in and emitted for the operation thereof in the direction of the airflow which is required to obtain the lift of the aerofoil, specifically along the surface of the aerofoil. This effect provides further reduction of the minimum speed of the aircraft.

In principle, it would be conceivable to carry out the above-mentioned pivoting movement between the first and second lift bodies for adjustment between the cruising flight position and the take-off/landing position by pivotally mounting the second lift body on a fuselage of an aircraft. Preferably, however, the first lift body comprises fastening means for supportingly fastening the aerofoil to a fuselage or is integrally connected to a fuselage of an aircraft, since the first lift body can be in particular stationary relative to the fuselage and thus advantageously forms the portion for fastening to the fuselage.

Since, according to the invention, the engine is attached to the second lift body and thus can be pivoted together with the second lift body, the engine can be rigidly connected to the second lift body without providing an additional pivoting mechanism or the like, and therefore a direction of thrust of the engine extends in parallel with the direction of flow of the second lift body.

In another preferred embodiment of the invention, it is provided that, in the cruising flight position, the direction of flow of the first lift body extends substantially in parallel with the direction of flow of the second lift body, and that, in the take-off/landing position, a direction of flow of the first lift body extends substantially orthogonally to a direction of flow of the second lift body. In this embodiment, the second lift body can be placed in the take-off/landing position in such a way that the flow deflected thereby is directed vertically downwards, and, at the same time, the direction of thrust of the engine which is attached to the second lift body points vertically upwards. The aerofoil is then designed for hovering flight and vertical take-off and landing.

According to a second aspect of the present invention, the above-mentioned object is achieved by an aerofoil for an aircraft, in particular an aerofoil according to the above-described first aspect of the invention, comprising a first lift body, a second lift body which is arranged behind the first lift body in the direction of flow of the aerofoil, the second lift body being pivotable relative to the first lift body between a cruising flight position in which both lift bodies together define an elongate and substantially continuous cross section of the aerofoil in the direction of flow, and a take-off/landing position in which the second lift body is angled downwards relative to the first lift body in order to increase a lift of the aerofoil, and an engine, wherein, in the cruising flight position, the engine can be sunk in the first lift body or in the second lift body.

As in the case of an aerofoil from the first aspect of the invention, an aerofoil from the second aspect of the invention also has improved properties when flying at low speed and improved properties during take-off and landing, but also increases the effectiveness of the aerofoil during cruising flight. For the purpose of flying at low speed and for take-off and landing, the engine moves out of the aerofoil and generates additional flow over the surface of the aerofoil in order to prevent a stall and thus reduce the minimum speed. If the direction of thrust of the engine can further be pivoted upwards, by means of the corresponding repulsion, it can generate additional lift in order to further reduce the minimum speed or it can even keep the aircraft completely in hovering flight in the case of a vertical take-off aircraft. However, at the same time, the invention from the second aspect can make it possible to sink the engine in the cruising flight position so that it only contributes to the air drag of the aerofoil to a minimal extent or preferably no longer contributes thereto at all.

Within the meaning of the present disclosure, cruising flight is an operating state in which the speed of the aircraft is above the minimum speed, and further acceleration of the aircraft in the direction of flight or deceleration is undesirable at the time. During cruising flight, thrust in the direction of flight is thus only required to the extent that the air drag of the aircraft has to be overcome in order to maintain the current speed. During cruising flight, considerably less thrust is thus required, which can be maintained by one or a few engines, for example by cruising thrust engines which are arranged on a tail of the fuselage. An engine on the aerofoil which is (only) required for flying at low speed and take-off or landing can then, according to the second aspect of the invention, advantageously be sunk in the first lift body or in the second lift body. At the same time, however, pivotally mounting the second lift body makes it possible to manoeuvre the aircraft during cruising flight, even when the at least one engine is switched off and is sunk in the aerofoil.

An optimal reduction of the level of flow drag during cruising flight is achieved when, in the sunk position, the engine is received substantially completely inside the lift body, and therefore it makes substantially no contribution any more to the flow cross section of the aerofoil. In an engine-receiving portion of the lift body in which the engine can be sunk in the lift body, a maximum dimension of the engine which is measured orthogonally to the direction of thrust can be substantially equal to or less than a maximum dimension of the lift body which is measured orthogonally to the direction of flow of the relevant lift body. The construction of the cross section or the surface of the lift body can thus take place virtually independently of the engine from an aerodynamic point of view, and the aerofoil in particular does not have to have any thickening or any other type of adaptation in the region of the engine-receiving portion.

Preferably, in the cruising flight position, the engine can be sunk in an opening in the lift body in such a way that a surface of the engine continuously extends a respectively adjacent surface of the lift body on both of the peripheral portions of the opening which oppose one another in the direction of flow. Alternatively, it can be provided that, in the cruising flight position, the engine can be sunk in an opening in the lift body and that on the lift body a flap is held which closes the opening after the engine has been sunk such that a surface of the flap continuously extends a respectively adjacent surface of the lift body on both of the peripheral portions of the opening which oppose one another in the direction of flow. In both cases, in the engine-receiving portion, i.e. at the opening in which the engine is sunk, the aerofoil does not have any projection or depression or any other aerodynamically disadvantageous modifications to the surface of the aerofoil which disrupt the flow, and therefore, in the cruising flight position, the aerofoil has a virtually optimal aerodynamic shape.

An opening in the lift body for receiving the engine can be designed to be particularly small and space-efficient when the engine can be moved along an axis between the cruising flight position and the take-off/landing position, which axis extends orthogonally to the direction of flow of the lift body on which the engine is held. The direction of thrust of the engine and the direction of flow of the lift body can thus always extend in parallel with (and in the opposite direction to) one another.

In an aerofoil according to the first aspect or according to the second aspect of the invention, the engine is preferably arranged on an upper face of the aerofoil or (in the case of the second aspect of the present invention) can be extended towards an upper face of the aerofoil. In this way, the engine can support the flow on the upper face of the aerofoil, i.e. in the region in which, when flying at low speed, the flow is firstly at risk of stalling.

In an alternative variant of the invention, the engine can be arranged substantially completely behind the second lift body in the direction of flow. During cruising flight or at relatively high speeds, this variant can have the advantage that the engine is arranged in the wake of the first and second lift bodies, and therefore in this variant as well, it is possible to achieve a reduction in the air drag and thus an increase in the effectiveness.

The engine of an aerofoil from the first and/or second aspect of the invention can be driven electrically, in particular it can be an electrically driven ducted fan. In particular for small aircraft, an electric drive mechanism offers greater flexibility. A ducted fan additionally has an outstanding power-to-weight ratio. Electrical energy sources (batteries) for driving the engine can advantageously be accommodated inside the aerofoil, more preferably inside the lift body which is rigidly connected to the fuselage of the aircraft (e.g. the first lift body).

In another preferred embodiment of the present invention, the aerofoil comprises a plurality of engines which are arranged side by side in a row extending transversely to the direction of flow. The generation of a specific overall thrust can be achieved by using a plurality of smaller engines which have a higher thrust-to-weight ratio than when using fewer larger engines. In addition, a plurality of engines provide greater fail safety and greater flexibility in terms of the distribution of the thrust on the aerofoil, and thus make it possible to reduce the installation space to be provided for receiving the engines, and therefore the aerofoil can have a relatively small height.

More preferably, a plurality of first engines are mounted on the same first support, the first support being arranged on the aerofoil in such a way that it can pivot about an axis extending transversely to the direction of flow, and a plurality of second engines are mounted on the same second support, the second support being arranged on the aerofoil in such a way that it can pivot about the same axis or another axis extending transversely to the direction of flow. The first support and the second support can then be pivoted relative to one another. This not only increases safety in the event of a malfunction of a pivoting mechanism of one of the two supports, but also further increases the flexibility of the control of the thrust in terms of strength and orientation. Engines which can be controlled independently of one another can further take over tasks for manoeuvring the aircraft.

According to a third aspect of the present invention, an aircraft is provided which comprises an aerofoil according to the first and/or second aspect of the invention. Within the scope of the present invention, aircraft having improved properties when flying at low speed are meant, in particular vertical take-off aircraft, which are designed for hovering flight.

An aircraft from the invention can comprise a fuselage and two aerofoils according to the first and/or second aspect of the invention which extend from opposing sides of the fuselage, a centre of thrust of all the engines of the aerofoils being able to be located behind a centre of gravity of the aircraft in the direction of flight, and the aircraft being able to comprise at least one front engine module, which is arranged in front of the centre of gravity of the aircraft in the direction of flight. When flying at low speed or during hovering flight, the thrust forces of the front engine module and of the engines of the aerofoils can thus stably balance the position of the aircraft. In particular in this case, it is meant that the front engine can likewise be pivoted between a cruising flight position in which a direction of thrust of the front engine module is oriented substantially horizontally in the forward direction, and a take-off/landing position in which the direction of thrust of the front engine module is oriented substantially vertically upwards.

Analogously to the advantages set out above of the second aspect of the invention, it is also proposed for the front engine module that, in a cruising flight position, said module can be sunk inside the fuselage. Thus, during cruising flight, the front engine module does not contribute to the air drag of the aircraft when the forward thrust thereof is not required.

The stability of the aircraft, in particular when flying at low speed and during take-off and landing, can be further improved when the aerofoil or the aerofoils is/are arranged at the rear end of the fuselage. In this way, the at least one front engine module and the engine of the aerofoil are relatively far apart and can keep the fuselage arranged therebetween in the desired position in a stable manner.

In another preferred embodiment of the invention, the aircraft further comprises at least one cruising thrust engine, which can be arranged for example not on the aerofoils, but rather on the fuselage, in particular on a rear face of the fuselage. The cruising thrust engine is configured to provide the thrust required for maintaining a desired cruising speed and accordingly preferably cannot be pivoted or sunk. During cruising flight, preferably only the at least one cruising thrust engine is in operation, whereas the engines provided for flying at low speed or for take-off/landing are switched off and optionally sunk in the aerofoils or in the fuselage, and therefore the air drag can be reduced to a minimum, and the efficiency of the aircraft during cruising flight can be maximised.

Figure 2:
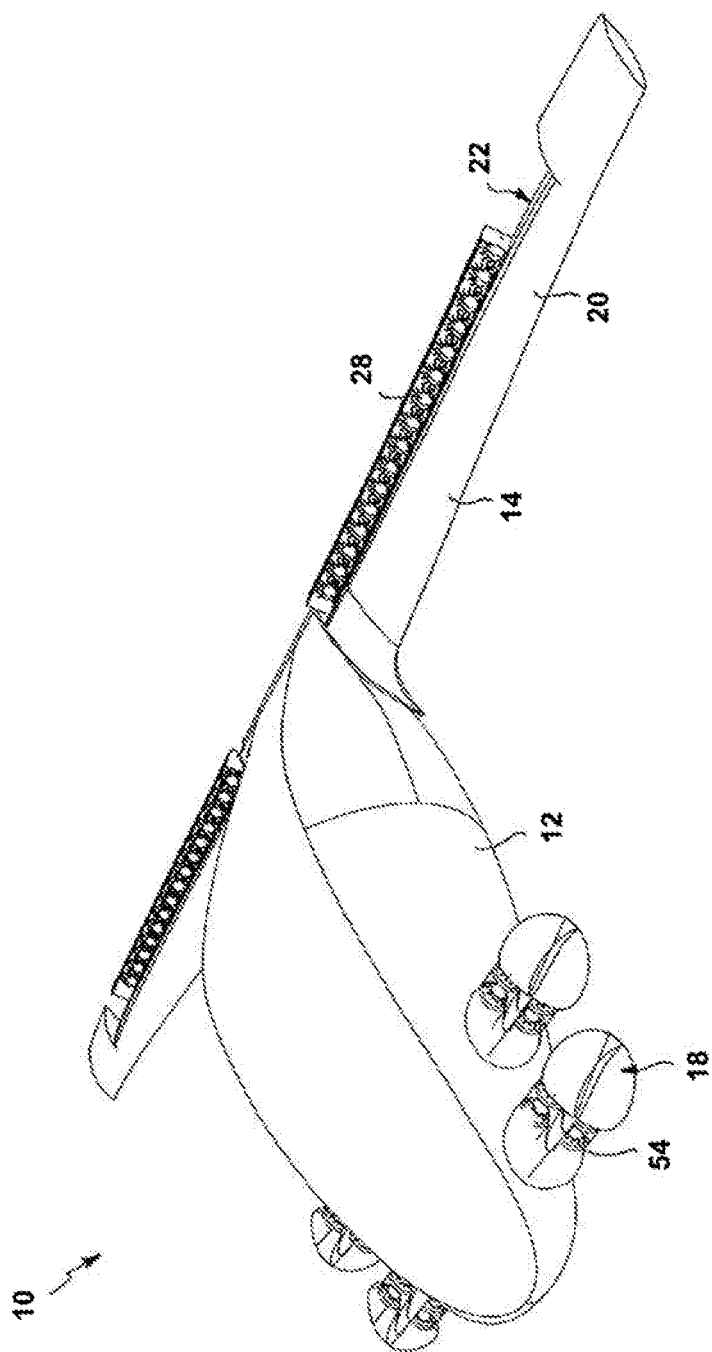
Figure 3:
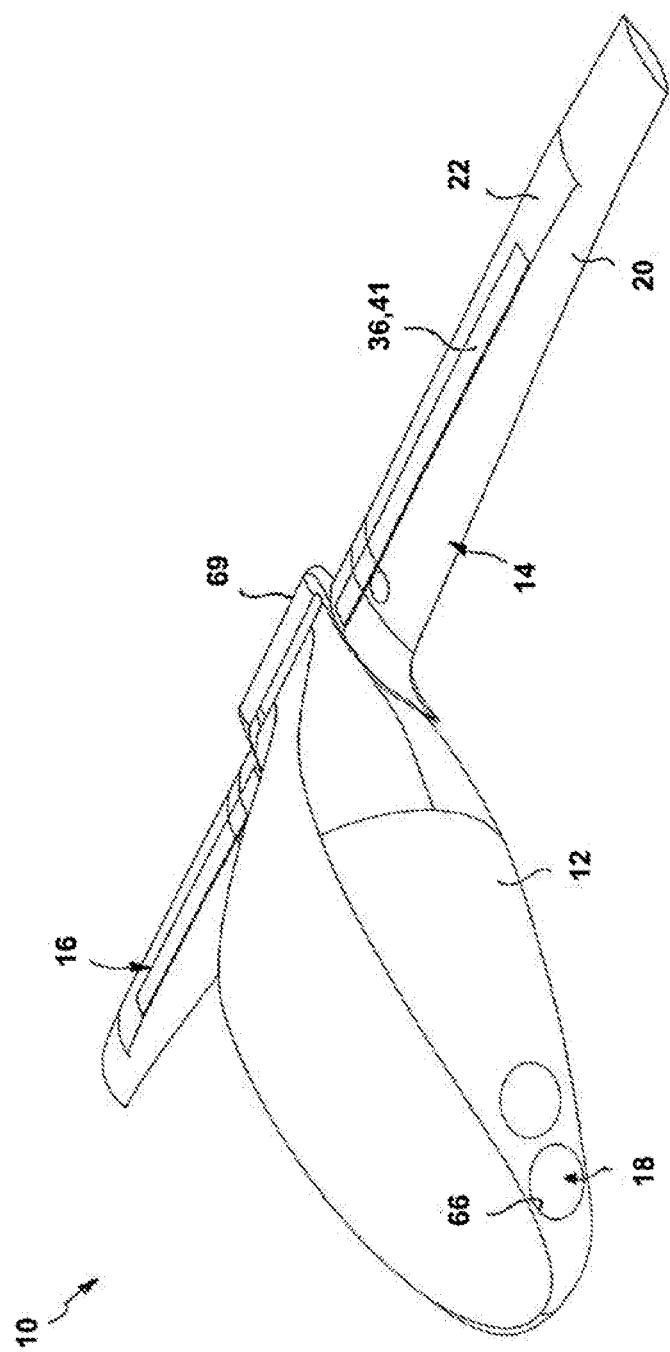
Figure 4:
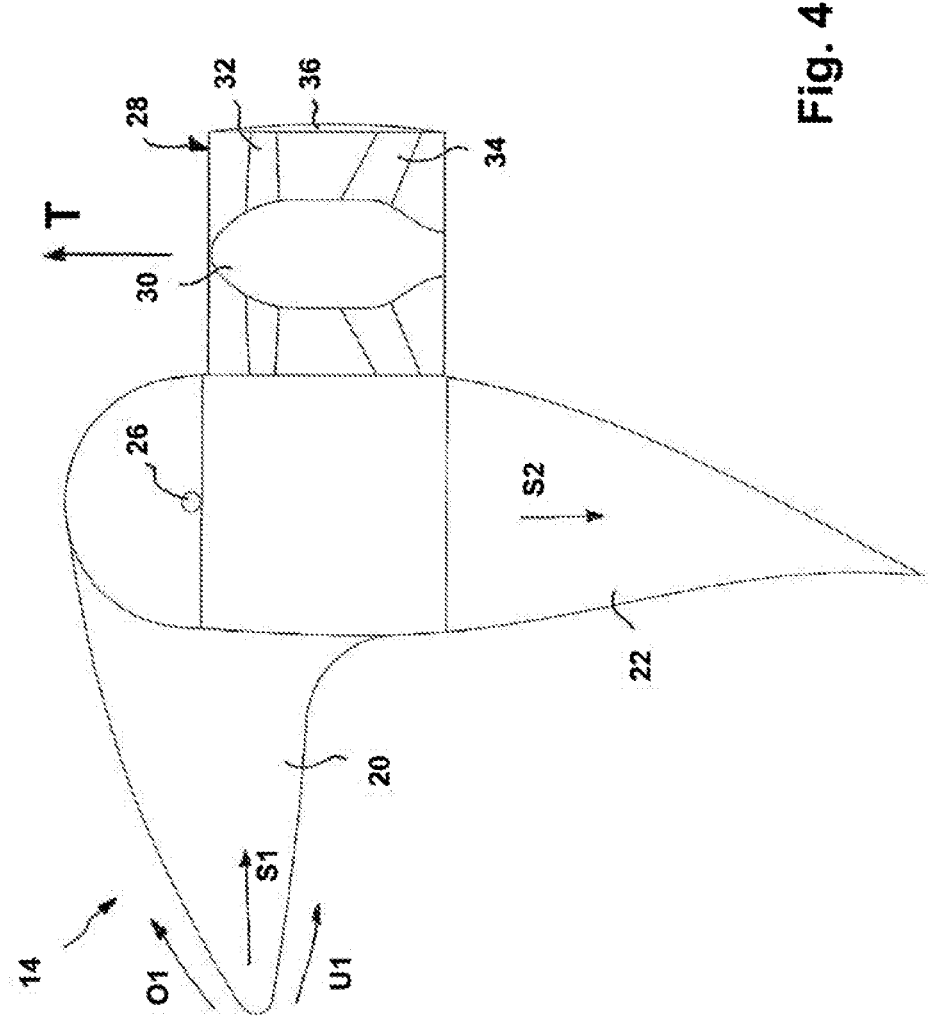
Figure 5:
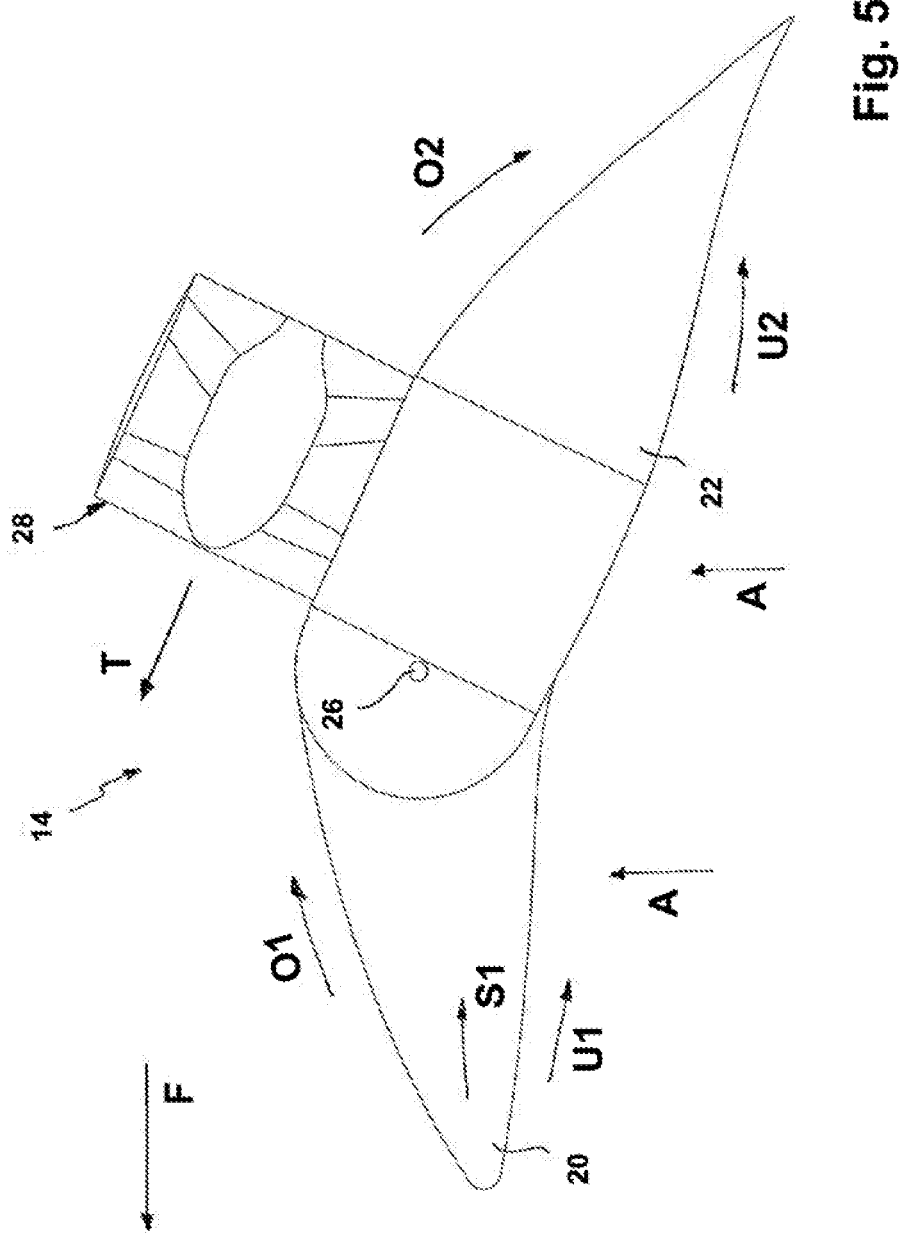
Figure 6:
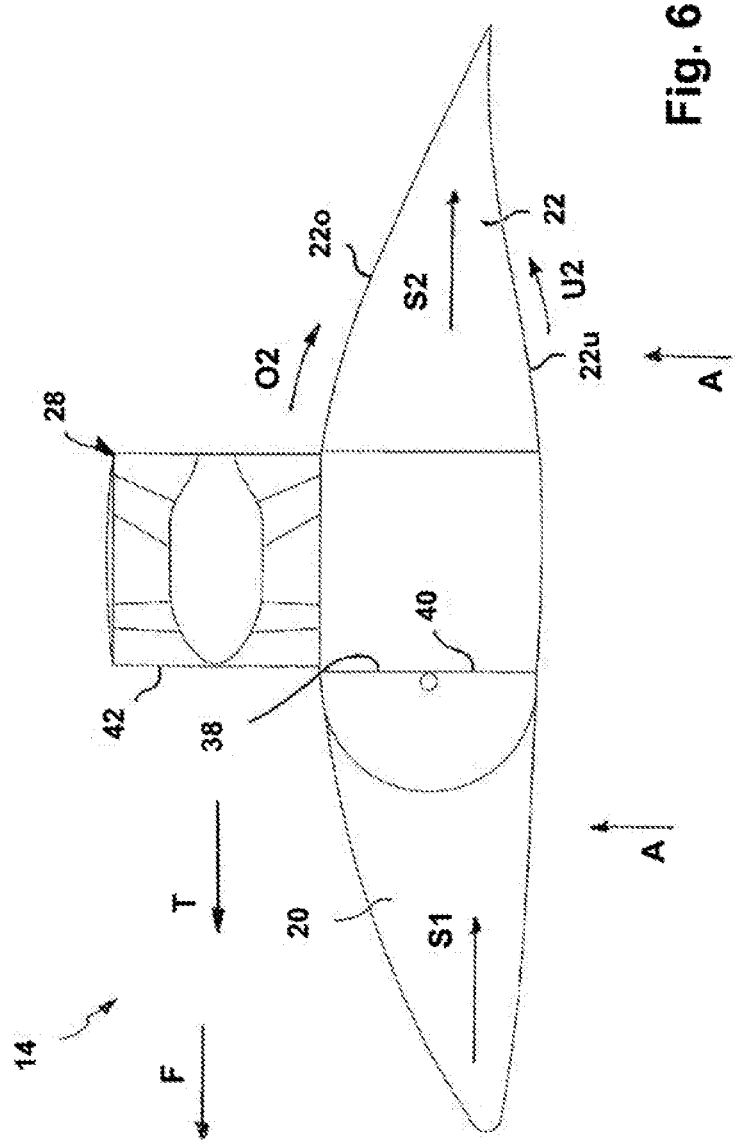
Figure 7:
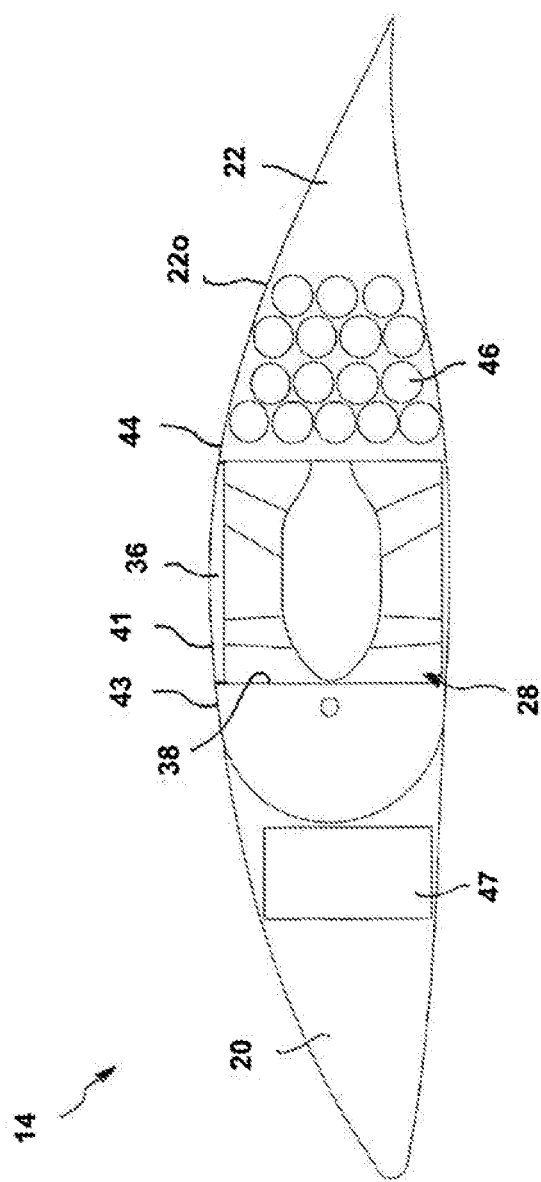
Figure 11:
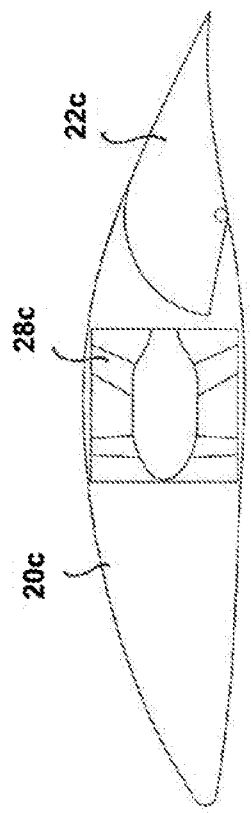
Figure 10:
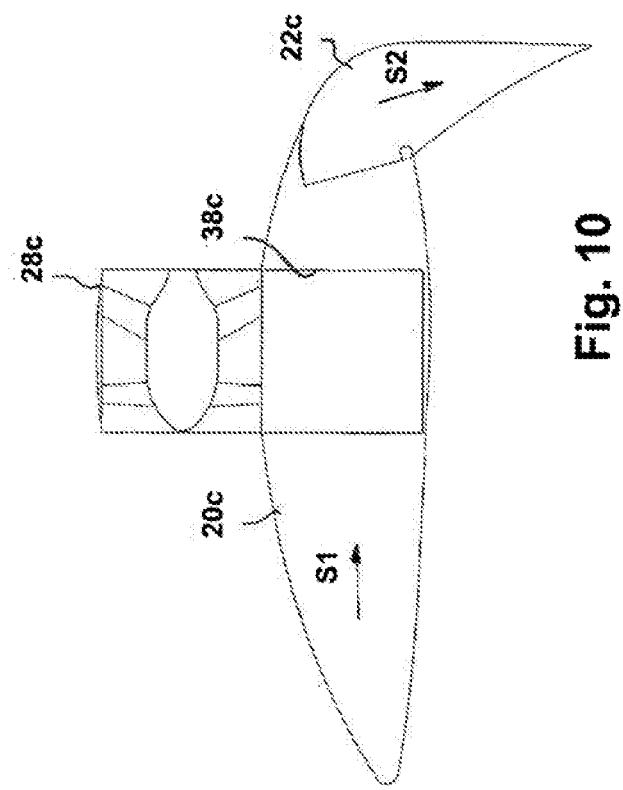
Figure 13:
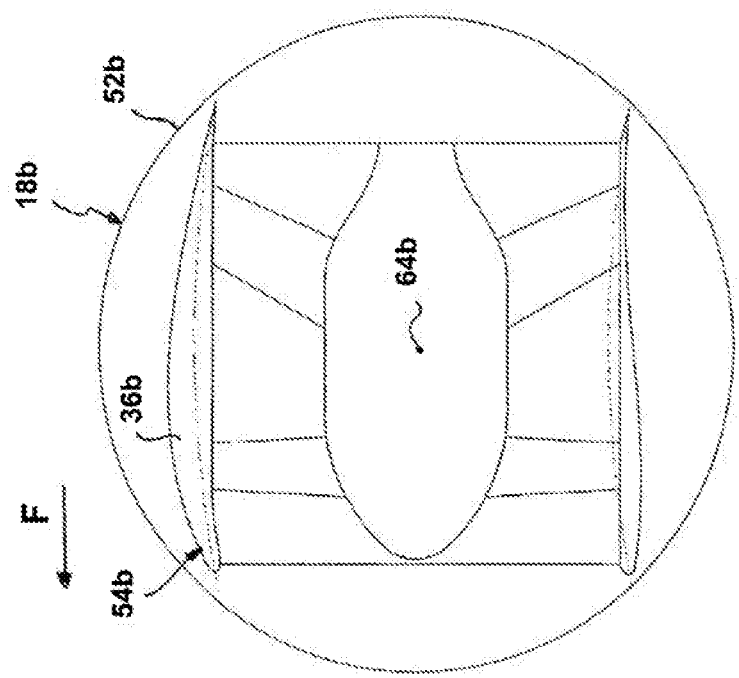
Figure 12:
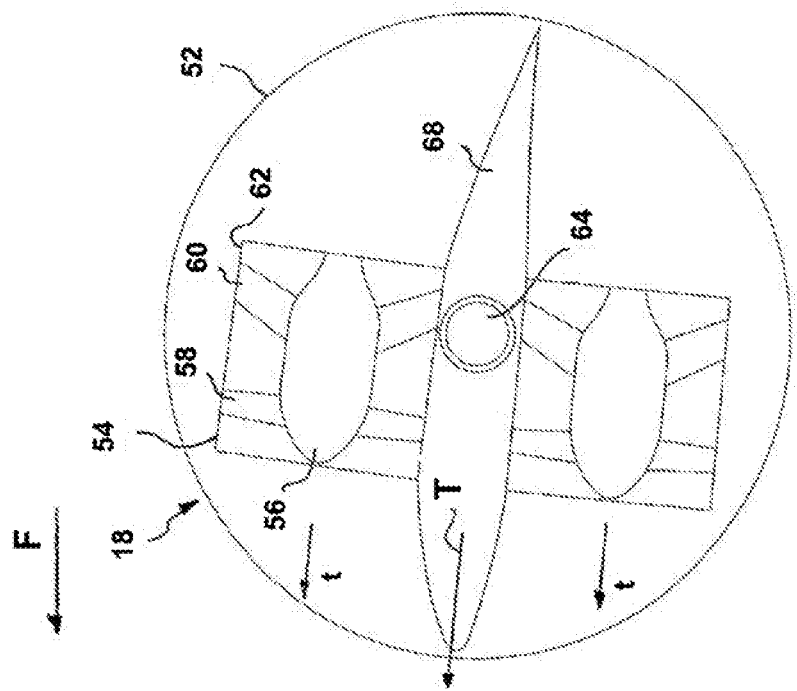
Figure 14:
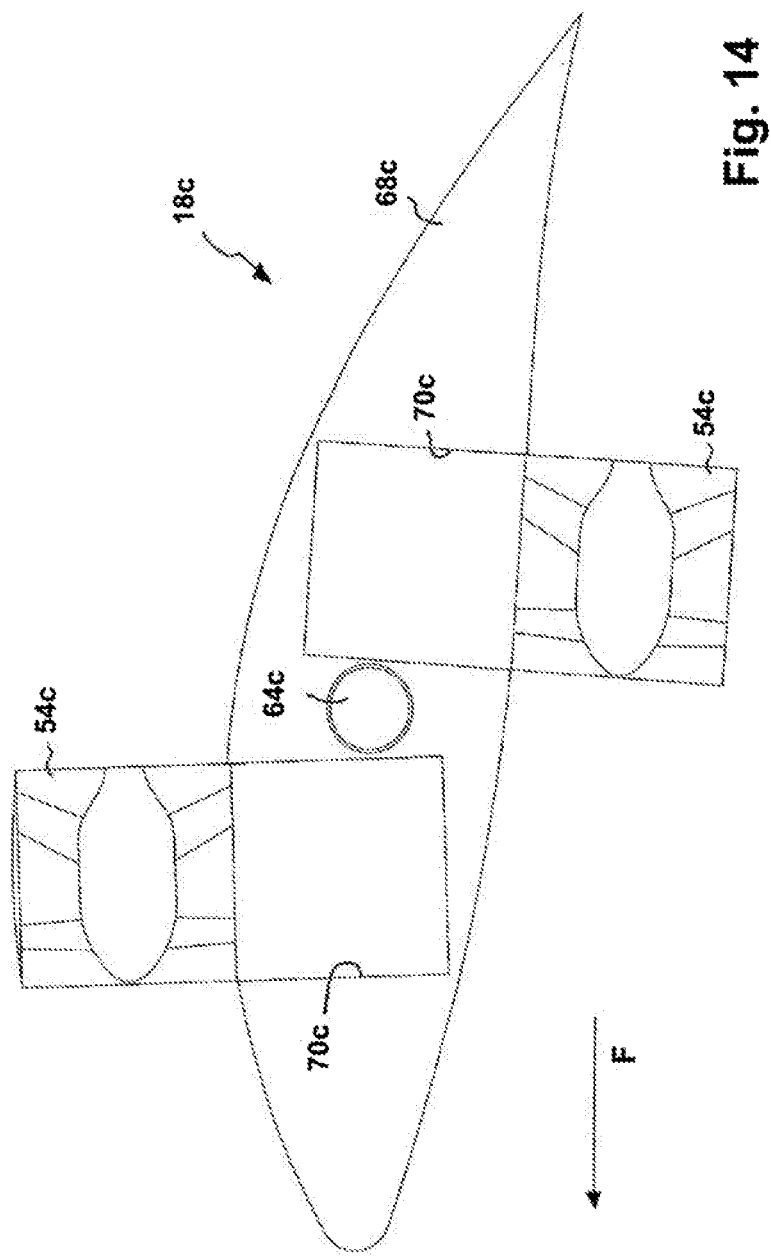

The invention is explained in greater detail in the following by way of preferred embodiments, with reference to the accompanying drawings, in which:

FIG. 1 is a perspective view of an aircraft according to an embodiment of the invention during hovering flight, FIG. 2 is a perspective view of the aircraft from the embodiment when flying at low speed, FIG. 3 is a perspective view of the aircraft from the embodiment during cruising flight, FIG. 4 is a sectional view of an aerofoil of the aircraft from the embodiment in a sectional plane extending in the direction of flight for operation during hovering flight, FIG. 5 is a view according to FIG. 4, but for flying at low speed, FIG. 6 is a view according to FIG. 4, but for cruising flight, FIG. 7 is a view according to FIG. 6, but in a state in which an engine is sunk inside the aerofoil, FIG. 8 is a view according to FIG. 4, but for a second embodiment of the invention during hovering flight, FIG. 9 is a view of the second embodiment according to FIG. 8, but during cruising flight, FIG. 10 is a view according to FIG. 4, but for a third embodiment of the invention during hovering flight, FIG. 11 is a view of the third embodiment according to FIG. 10, but during cruising flight, FIG. 12 is a sectional view of a first variant of a front engine module of the aircraft from the first embodiment of the invention in a sectional plane extending in the direction of flight, FIG. 13 is a view according to FIG. 12, but for a second variant, and FIG. 14 is a view according to FIG. 12, but for a third variant of the invention.

Figure 15:
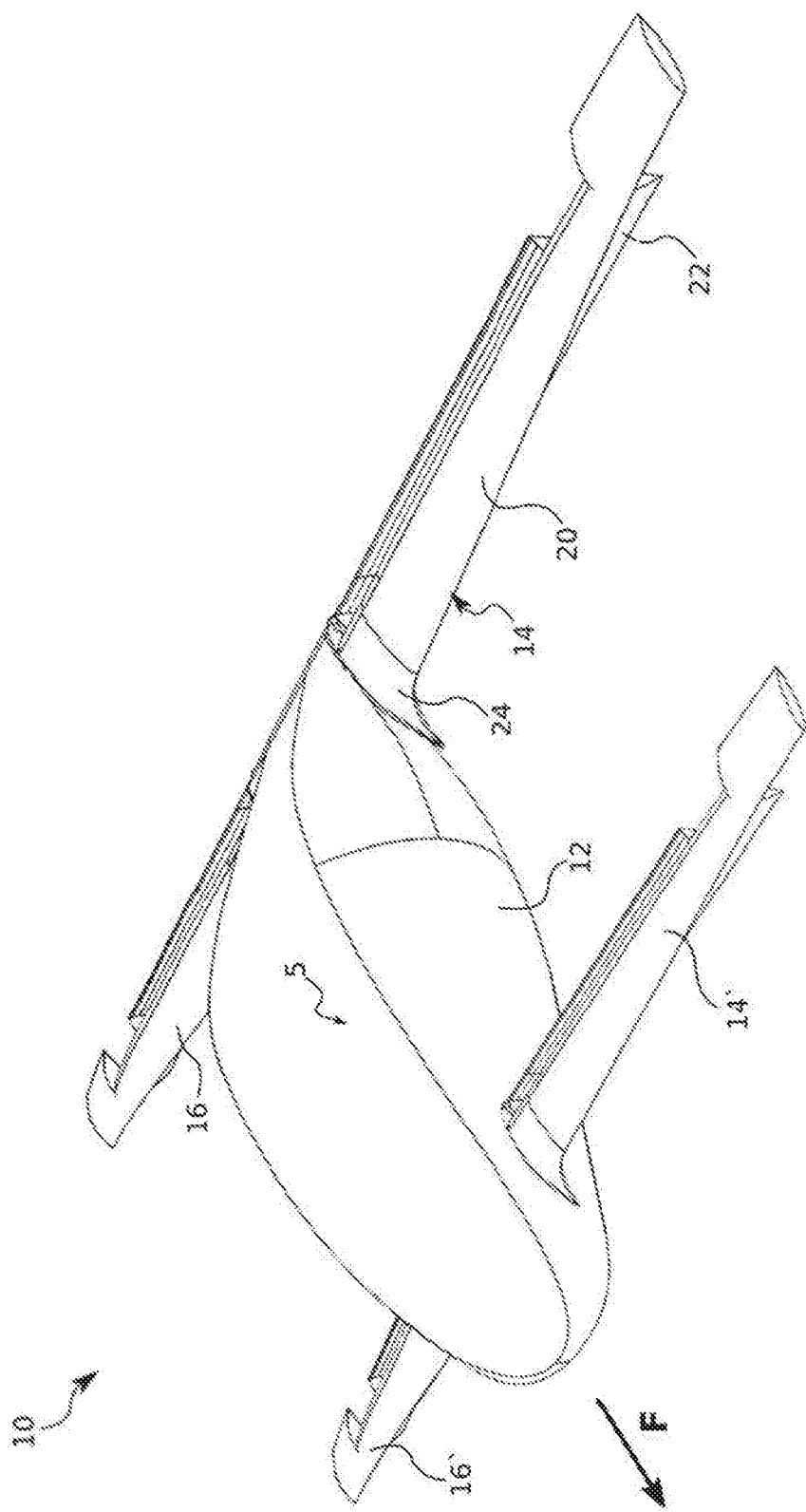
Figure 16:
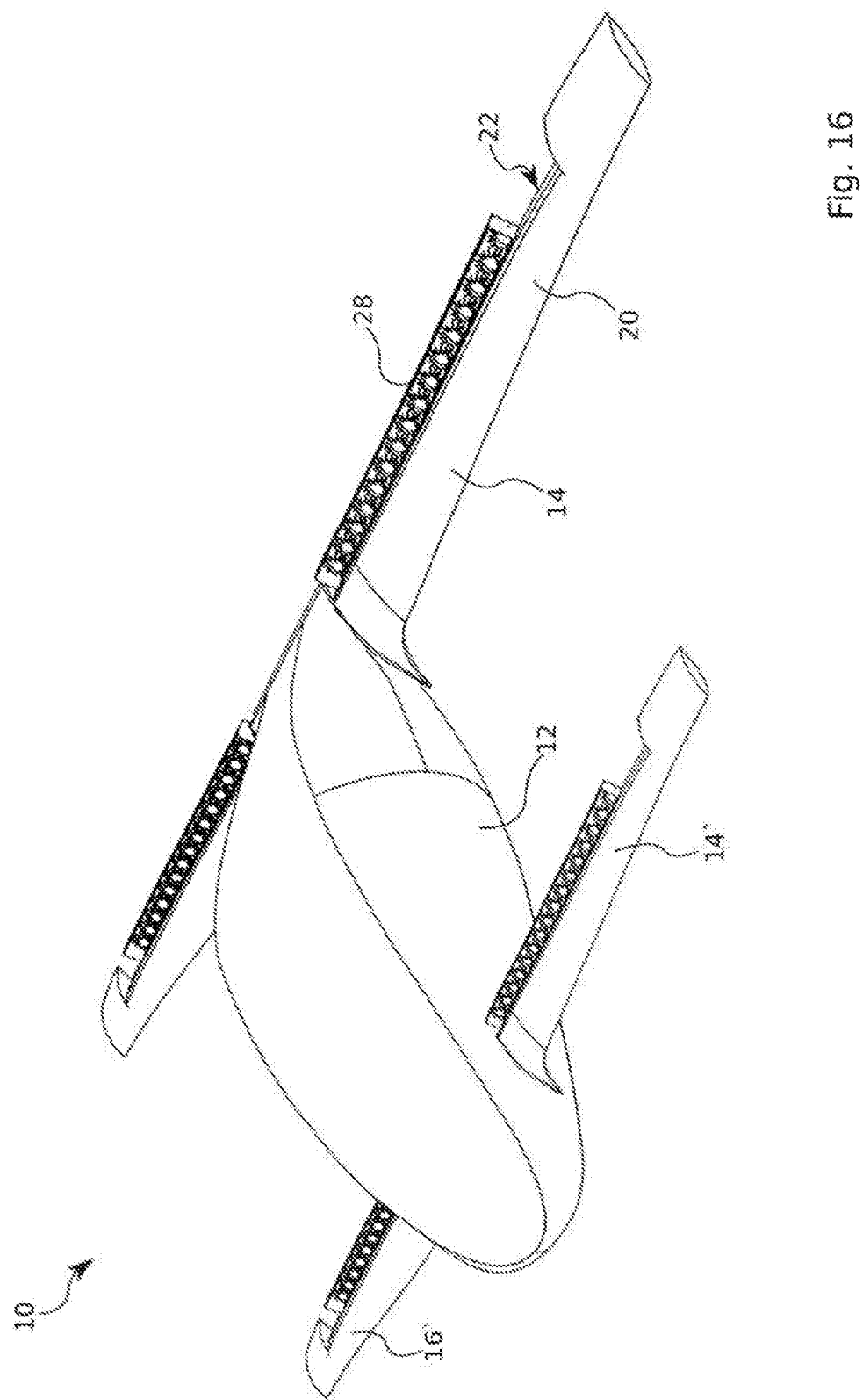
Figure 17:
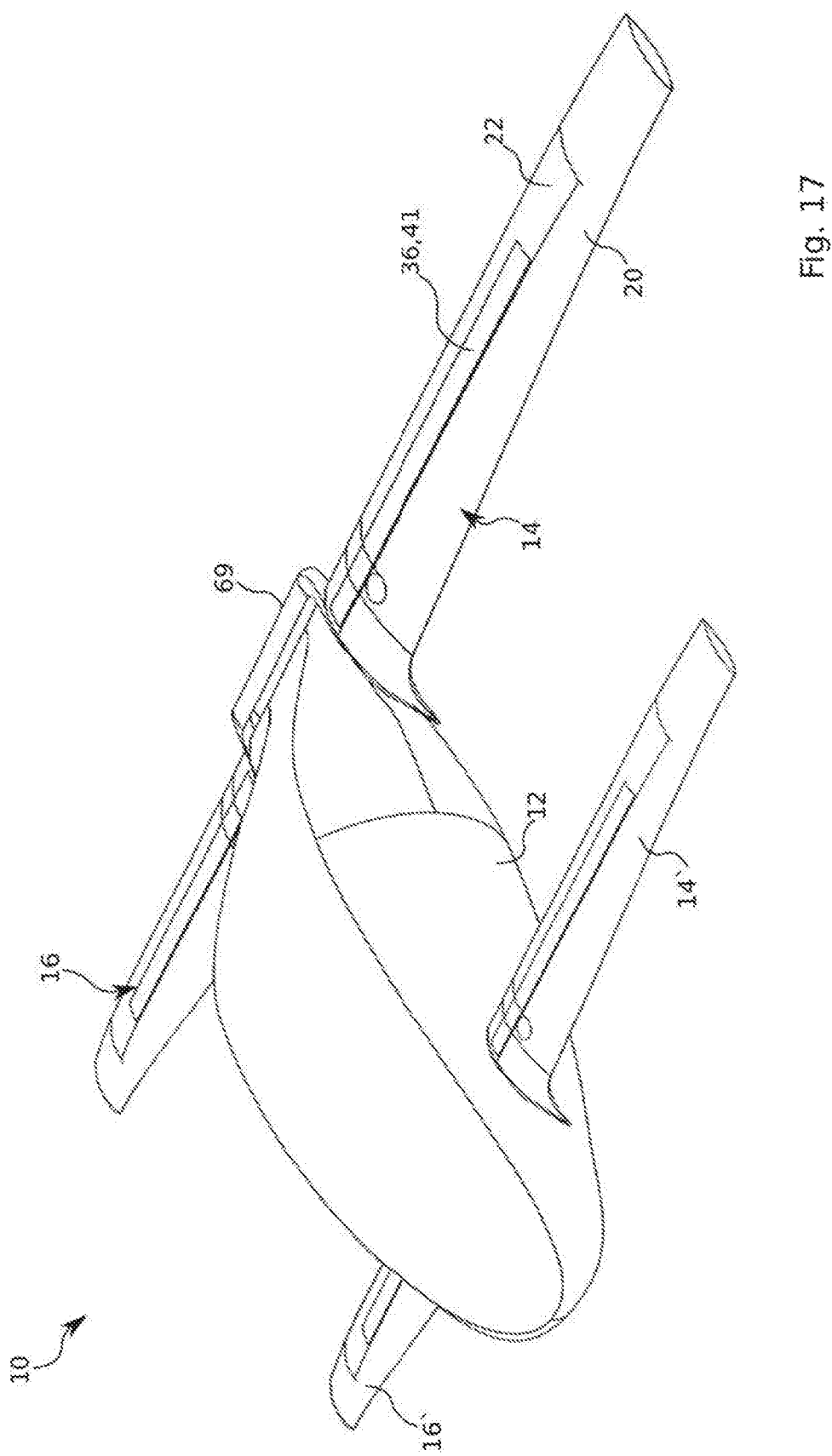

FIG. 15 is a perspective view of an aircraft according to another embodiment of the invention during hovering flight, FIG. 16 is a perspective view of the aircraft from the embodiment according to FIG. 15 when flying at low speed, FIG. 17 is a perspective view of the aircraft from the embodiment according to FIG. 15 during cruising flight, An aircraft generally denoted by 10 in FIGS. 1 to 3 according to the first embodiment of the invention comprises a fuselage 12, a left aerofoil 14, a right aerofoil 16 and at least one front engine module 18. With respect to a direction of flight F, the front engine module 18 is located in a front portion of the fuselage 12, and the aerofoils 14, 16 extend from a rear portion of the fuselage 12, proceeding laterally to the left and to the right respectively. To be more precise, a centre of thrust of the at least one front engine module 18 (in the case of a plurality of front engine modules, a centre of thrust of all the front engine modules) is arranged in front of a centre of gravity S of the aircraft 10 in the direction of flight F, and an overall centre of gravity of the two aerofoils 14, 16 is arranged behind the centre of gravity S of the aircraft 10 in the direction of flight F.

As can additionally be seen in FIGS. 1 to 3, and is shown in greater detail with reference to FIGS. 4 to 7 for the left aerofoil 14, the aerofoils 14, 16 each comprise a first lift body 20 and a second lift body 22. The first lift body 20 is arranged in front of the second lift body 22 in the direction of flight F and comprises a fastening portion 24 at which it is attached to the fuselage 12 of the aircraft 10. Alternatively, the fuselage 12 and the first lift body 20 can be formed integrally with one another.

The first lift body 20 is preferably connected to the fuselage 12 in a rigid or stationary manner in such a way that a direction of flow S1 of the first lift body 20, which approximately corresponds to an average value of a flow O1 over an upper face of the first lift body 20 and a flow U1 over a lower face of the first lift body 20 (see FIG. 4), which extends approximately in parallel with the direction of flight F of the aircraft 10.

The second lift body 22 is pivotally attached to the first lift body 20 at a pivot axis 26, which extends along the extension direction of the aerofoil 14 and therefore approximately orthogonally to the direction of flight F and horizontally, so that the second lift body 22 can be pivoted between a cruising flight position (FIGS. 6 and 7) in which a direction of flow S2 of the second lift body 22 is oriented approximately in parallel with the direction of flow S1 of the first lift body 20 and in parallel with the direction of flight F, a low-speed-flight position in which the direction of flow S2 of the second lift body 22 is inclined or angled downwards relative to the direction of flow S1 of the first lift body 20 by an angle (of for example between 20° and 80°) and—if the aircraft 10 is designed for hovering flight—a hovering flight position (FIG. 4) in which the direction of flow S2 of the second lift body 22 is angled downwards relative to the direction of flow S1 of the first lift body 20 by approximately 90°, so that the direction of flow S2 of the second lift body points vertically downwards towards the ground. The direction of flow S2 of the second lift body 22 is defined in this case as the average value between a direction of a flow O2 in the cruising flight position along an upper face 22o of the second lift body 22 and a flow U2 in the cruising flight position along a lower face 22u of the second lift body 22 (see FIG. 6).

According to the first aspect of the invention, at least one engine 28 is arranged on the second lift body 22. Preferably, the second lift bodies 22 of each of the aerofoils 14, 16 respectively support a plurality of engines 28 which are arranged side by side in a row (see FIG. 2), the rows of engines 28 extending along the aerofoils 14 and 16 respectively, i.e. approximately horizontally and transversely to the direction of flight F. For example, each row of engines 28 comprises more than three engines, preferably more than 10 engines (in the embodiment, 16 engines). In the following, only one engine 28 of the left aerofoil 14 is described representatively.

The engine 28 is preferably an electrically operated engine, in particular a ducted rotor, which comprises a rotor 30 having rotor blades 32 and stator blades 34 which are fixed relative to the housing and hold the rotor 30 in the centre of a cylindrical casing 36 in a rotatable manner. The axis of rotation of the rotor 30 coincides with the central axis of the cylindrical casing 36, and these axes define a direction of thrust T of the engine 28. Preferably, the direction of thrust T extends in parallel with (and in the opposite direction to) the direction of flow S2 of the second lift body 22. A pivoting movement of the second lift body 22 about the axis 26 relative to the first lift body 20 equally brings about a pivoting movement of the direction of thrust T of the engine 28 so that the direction of thrust T during cruising flight points in the forward direction in parallel with the direction of flight, is directed obliquely upwards when flying at low speed, and optionally points vertically upwards during hovering flight.

Furthermore, in FIGS. 4 to 7, it can be seen that the engine 28, when in the operational position, is arranged on the upper face 22o of the second lift body 22, i.e. on the face which points upwards during cruising flight. As is shown in FIG. 5, the arrangement of the engine 28 on the upper face 22o of the aerofoil 14 achieves the effect of intensifying or maintaining a flow O1, O2 over the upper face of the first lift body 20 and the second lift body 22. Both the air flow which is sucked in on the input side by the engine 28 and the flow emitted by the engine 28 in the repulsion direction (in the opposite direction to the direction of thrust T) therefore intensifies or generates the flow required for lift of the aerofoil 14 along the upper face 22o of the aerofoil 14, by means of which a corresponding lift force A acts on the aerofoil 14 in the upwards direction. Thus, even in the case of a flight speed which is so slow that, without using the engine 28, the lift force A would decrease under the proportionate weight of the aircraft 10, or a stall would occur on the upper face of the aerofoil 14, by using the engine 28 over the upper face of the aerofoil 14, a sufficiently strong flow can be maintained to continue to allow flight. In other words, by means of the operation of the engine 28, it is possible to considerably reduce the minimum speed of the aircraft. Accordingly, an outlay for take-off and landing systems, e.g. a length of a take-off and landing strip, can be reduced.

If the aircraft 10 is designed as a vertical take-off aircraft and is capable of hovering flight according to FIG. 4, then the minimum speed decreases to 0. In the case of very low speeds or during hovering flight, although there is absolutely no flow over the upper face of the aerofoil 14, the direction of thrust T of the engine 28 is then directed vertically upwards, and the proportionate weight of the aircraft 10 can be supported by the repulsion of the engine 28.

As can be seen in FIGS. 6 and 7, during cruising flight, the engine 28 can preferably be sunk inside the second lift body 22 in order to minimise the air drag during cruising flight when the engine 28 is no longer required for thrust and can be switched off. For this purpose, the second lift body preferably has an opening 38 in which the engine 28 can be sunk. A mechanism for sinking the engine 28 can comprise rail means 40 in the opening 38 which extend perpendicularly to the direction of flow S2 of the second lift body 22 and perpendicularly to the extension direction of the aerofoil 14, and on which corresponding rail means 42 of the engine 28 slide or roll when the engine 28 is retracted and extended.

FIG. 7 shows the engine 28 in the completely retracted state. It can be seen that the engine 28 can be completely sunk inside the second lift body 22. An upper face 41 of the engine 28, in particular an outer surface of the casing 36, ends in a continuous and flush manner both with a peripheral portion 43 of the opening 38 which is at the front in the direction of flow S2 and with a peripheral portion 44 of the opening 38 which is at the rear in the direction of flow. In the sunk state, the surface 22o of the second lift body 22 is thus also continuously closed over the opening 38 and is free of steps, projections and depressions or the like.

Furthermore, in FIG. 7, it can be seen that the thickness of the second lift body 22 in the vertical direction is adapted to the dimension of the engine 28 in this direction, and therefore the thickness of the second lift body 22 is substantially equal to or only slightly greater than the size of the engine 28, and thus the available installation space can be used optimally. FIG. 7 further shows an arrangement of a plurality of energy-storage elements 46, in particular batteries for operating the engine 28, inside the second lift body 22 and a wing spar 47 inside the first lift body 20, which extends rigidly outwards from the fuselage 12 as a supporting component and forms part of the fastening portion 24.

In FIGS. 8 and 9, a second embodiment of the invention is shown, which is a variation of the first embodiment of the invention, and therefore in the following, only the differences from the first embodiment will be addressed, and otherwise, reference will be explicitly made to the description of the first embodiment. In the second embodiment, an engine 28b is attached to a rear-most end 50b in the direction of flow S2 of a second lift body 22b. A direction of thrust T of the engine 28b extends in parallel with the direction of flow S2.

In a first variant, the engine 28b can be designed in such a way that it cannot be sunk in the second lift body 22b. However, an increase in the air drag by the engine 28b during cruising flight is also minimised in the second embodiment, specifically by arranging the engine 28*b* virtually in the wake of the aerofoil, since the engine 28*b* is positioned precisely behind the second lift body 22*b* in the direction of flow S2 during cruising flight (FIG. 9). In another variant, the engine 28*b* can be collapsible so that the air drag thereof is further reduced when said engine is switched off. Furthermore, another advantageous variant is conceivable in which the engine 28*b*—after being switched off and optionally also after being collapsed—is sunk in a rear opening in the second lift body 22*b*.

The pivoting and operation of the second lift body 22*b* and of the engine 28*b* for hovering flight, flying at low speed and cruising flight otherwise correspond to those in the first embodiment.

In FIGS. 10 and 11, a third embodiment of the invention is shown, which is a variation of the first embodiment of the invention, and therefore in the following, only the differences from the first embodiment will be addressed, and otherwise, reference will be explicitly made to the description of the first embodiment. In the third embodiment, an engine 28*c* is arranged on a first lift body 20*c* which is at the front in the direction of flight, in particular on a lift body 20*c* which is rigidly connected to a fuselage of an aircraft, so that it is not also pivoted during a pivoting movement of a second lift body 22*c* which is at the rear in the direction of flight. A direction of thrust T of the engine 28*c* is thus always in parallel with the direction of flow S1 of the first lift body 20*c*.

In order to reduce air drag of the aerofoil during cruising flight (FIG. 11), in the third embodiment, the engine 28*c* can also be sunk in an opening 38*c* in the first lift body 20*c*.

In the third embodiment, hovering flight is also possible, since the flow emitted by the engine 28*c* follows the surface of the folded-down second lift body 22*c* (Coanda effect). If the engine 28*c* extends downwards out of the opening 38*c*, the emitted air flow directly hits the second lift body 22*c* and is deflected downwards. Furthermore, also in the embodiment according to FIGS. 10 and 11, by arranging the engine 28*c* on an upper face of the aerofoil, the minimum speed of the aircraft is reduced, and thus flying at low speed is supported, since the engine 28*c* conveys a flow over the upper face of the aerofoil and prevents a stall.

With reference to FIGS. 1 to 3 and FIG. 12, a first variant for the configuration of the front engine module 18 of the aircraft 10 is described below. In the following, an engine module 18 is described as shown in FIG. 10. Advantageously, however, the aircraft 10 comprises a plurality of front engine modules 18 of this type, which can be configured to be the same or functionally the same. In the embodiment shown, in particular four front engine modules are provided, two front right and two front left engine modules.

The front engine module 18 according to the first variant comprises a cylindrical support, on which a plurality of engine elements 54 are held. Each engine element 54 can comprise a rotor 56 having rotor blades 58 and can further comprise stator blades 60 which rotatably mount the rotor in a housing 62. The housing 62 can be in particular a cylindrical casing, the central axis of which coincides with the axis of rotation of the rotor 56 and defines a direction of thrust t of the engine element 54. Preferably, the directions of thrust t of all the engine elements 54 of the support 52 extend in parallel with one another and define an overall direction of thrust T of the front engine module 18.

The support 52 can be mounted on the fuselage 12 so as to be able to pivot about an axis 64. The axis 64 can extend horizontally and orthogonally to the direction of thrust T and/or can coincide with a central axis of a cylindrical shape of the support 52. By rotatably mounting the support 52, the front engine module 18 can be pivoted between a cruising flight position in which the direction of thrust T is oriented in the forward direction, substantially in parallel with the direction of flight, and a low-speed-flight position in which the direction of thrust T of the front engine module 18 is inclined obliquely upwards, and optionally also towards a hovering flight position in which the direction of thrust T of the front engine module 18 is directed vertically upwards.

Advantageously, the support 52 can also be held so as to be movable along the axis 64, so that the support 52 and thus the entire front engine module 18 is moved into a suitable opening 66 in the fuselage 12 and in particular can be completely sunk inside the fuselage 12 in order to minimise the air drag of the aircraft 10 during cruising flight. The retraction and extension of the front engine module 18 and the pivoting movement about the axis 64 can advantageously be carried out according to the axial position in the same or combined spiral movement by a helical thread path having an adapted height, so that only a single drive mechanism is required to control both movements.

In FIG. 12, it can further be seen that, inside the support 52, an additional lift element 68 is arranged, which can have a general aerofoil shape and extends in parallel with the direction of thrust T. When flying at low speed, but also at high speeds, said lift element 68 thus provides an additional increase in the lift in the front region of the aircraft 10. Since the lift element 68 can rotate together with the direction of thrust T of the engine elements 54 about the axis 64, by means of a front engine module 18 of this type, the same advantageous effects can be achieved when flying at low speed and during take-off and landing as have been described above for the aerofoil 14. Furthermore, the lift element 68 can extend along a diameter of the cylindrical support 52 and in particular can form a bearing portion for the axis 64 and connect said portion to outer portions of the support 52, so the lift element 68 can be of particular static significance for the front engine module 18.

In FIG. 1, it can further be seen that, on each side of the lift element 68, a plurality of engine elements 54 are arranged in each case in order to further improve the efficiency of the front engine module 18. In the specific embodiment, above the lift element 68, three engine elements 54 are arranged in a row extending orthogonally to the direction of flight F and, below the lift element 68, likewise three engine elements 54 are arranged in a row extending orthogonally to the direction of flight F.

During the cruising flight shown in FIG. 3, the engine elements 54 of the front engine modules 18 are taken out of operation, and the engine modules 18 are preferably sunk in the openings 66 in the fuselage. Furthermore, the engines 28 of the aerofoils 14, 16 are taken out of operation and preferably sunk in the openings 38 in the aerofoils 14, 16, as has been described above. A comparatively low, but still required forward thrust for maintaining the cruising flight speed and optionally for improving smaller adaptations of the speed can then be generated by at least one cruising thrust engine 69. The cruising thrust engine 69 can be arranged for example on a tail of the fuselage 12 of the aircraft.

FIG. 13 shows a second variant of an engine module 18*b*, which shows a variation of the first variant according to FIG. 12, and therefore in the following, only the differences from the first variant will be elaborated on, and otherwise, reference will be made to the description of the first variant.

In the second variant, a central additional lift body is omitted. Instead, a housing or casing 36b of an engine element 54b of the front engine module 18b is shaped in such a way that the cross section thereof, in a sectional plane in parallel with the direction of flight F (see FIG. 13), corresponds to the cross section of an aerofoil. The casing 36b of the engine element 54b thus forms a lift element which generates aerodynamic lift due to different flow speeds along the lower face thereof and along the upper face thereof. The size of the engine element 54b from the second variant, in the radial direction of the cylindrical support 52b, is adapted to the size of the support 52b so that the available installation space inside the support 52b is utilised. Depending on the axial length of the cylindrical support 52b, also in the second variant, a plurality of engine elements 54b can be arranged side by side in a row extending orthogonally to the direction of flight F in order to improve the efficiency of the front engine module 18b. The support 52b from the second variant is also preferably rotatable about a central horizontal axis 64b extending transversely to the direction of flight.

FIG. 14 shows a third variant of a front engine module 18c which cannot be sunk in the fuselage of the aircraft during cruising flight. Accordingly, a lift element 68c can be designed to be considerably larger and can provide a more considerable contribution to the lift of the aircraft in the front region of the fuselage. One or more engine elements 54c can be arranged on an upper face and/or on a lower face of the lift body 68c. In particular, the lift body 68c can have such a size that the at least one engine element 54c can be sunk inside the lift body 68c (for example in an opening 70c in FIG. 14) so that it is possible to further reduce the air drag during cruising flight.

Advantageously, the lift element 68c can be pivotally held on the fuselage 12 on an axis 64c extending transversely to the direction of flight F, in order to allow the adjusting movement towards a low-speed-flight position and optionally also towards a hovering flight position, which adjusting movement has already been described above for the second lift body 22 or 22b of the aerofoil 14.

In another variant which is not shown in FIGS. 15-17, instead of the at least one front engine module 18, at least one aerofoil 14' or 16' can be arranged, which is designed according to the example of the previously described aerofoil 14 or 16 from the first or second embodiment. By means of this variant or also the above-mentioned variants of the front engine module, lastly a configuration can be achieved in which the aircraft is stably supported with sufficient thrust or lift on four points arranged in a rectangle or trapezium (front left, front right, rear left, rear right).

The invention claimed is:

1. An aircraft, comprising a fuselage and first and second pairs of aerofoils, wherein the aerofoils of each pair extend from opposing sides of the fuselage, wherein each aerofoil comprises a first lift body, a second lift body, which is arranged behind the first lift body in a direction of flow of the aerofoil, the second lift body being pivotable relative to the first lift body between a cruising flight position in which both lift bodies together define an elongate and substantially continuous cross section of the aerofoil in the direction of flow, and a take-off/landing position in which the second lift body is angled downwards relative to the first lift body in order to increase a lift of the aerofoil, and at least one engine is arranged on the second lift body, wherein a center of thrust of all the engines of the second pair of aerofoils is located behind a center of gravity of the aircraft in the direction of flight and the first pair of aerofoils is arranged entirely in front of the center of gravity of the aircraft in the direction of flight such that a center of thrust of all the engines of the first pair of aerofoils is located in front of the center of gravity of the aircraft in the direction of flight.

2. The aircraft according to claim 1, wherein the first lift body of each of the aerofoils comprises fastening means for supportingly fastening the aerofoil to the fuselage of the aircraft or is integrally connected to the fuselage of the aircraft.

3. The aircraft according to claim 1, wherein a direction of thrust of the at least one engine of each second lift body extends in parallel with the direction of flow of said second lift body.

4. The aircraft according to claim 1, wherein in the cruising flight position, the direction of flow of each first lift body extends substantially in parallel with the direction of flow of its corresponding second lift body, and wherein in the take-off/landing position, a direction of flow of each first lift body extends substantially orthogonally to a direction of flow of its corresponding second lift body.

5. The aircraft according to claim 1, wherein at least one of the engines is arranged on an upper face of the corresponding second lift body.

6. The aircraft according to claim 1, wherein at least one of the engines is arranged substantially completely behind the corresponding second lift body in the direction of flow.

7. The aircraft according to claim 1, wherein at least one of the engines is an electrically driven ducted fan.

8. The aircraft according to claim 1, further comprising a plurality of engines on at least one of the second lift bodies which are arranged side by side in a row extending transversely to the direction of flow.

9. The aircraft according to claim 8, wherein the plurality of engines has a common substantially rectangular air inlet and a common substantially rectangular air outlet and each individual engine comprises a cylindrical casing in which a rotor is held.

10. The aircraft according to claim 8, wherein a plurality of first engines are mounted on the same first support, the first support being arranged on one of the aerofoils in such a way that it can pivot about an axis extending transversely to the direction of flow, a plurality of second engines are mounted on the same second support, the second support being arranged on said aerofoil in such a way that it can pivot about an axis extending transversely to the direction of flow, and wherein the first support and the second support can be pivoted relative to one another.

11. The aircraft according to claim 1, wherein the aircraft is a vertical take-off aircraft and is designed for hovering flight.

12. The aircraft according to claim 1, further comprising at least one cruising thrust engine, which is not arranged on the aerofoils, but rather on a rear face of the fuselage.

* * * * *